(12) United States Patent
Demsey et al.

(10) Patent No.: US 11,196,705 B2
(45) Date of Patent: Dec. 7, 2021

(54) IDENTIFICATION SERVICES FOR INTERNET-ENABLED DEVICES

(71) Applicant: NextRoll, Inc., San Francisco, CA (US)

(72) Inventors: Seth Demsey, Vienna, VA (US); Matt Pauker, San Francisco, CA (US)

(73) Assignee: NextRoll, Inc., San Francisco, CA (US)

( * ) Notice: Subject to any disclaimer, the term of this patent is extended or adjusted under 35 U.S.C. 154(b) by 0 days.

(21) Appl. No.: 16/224,526

(22) Filed: Dec. 18, 2018

(65) Prior Publication Data

US 2019/0215297 A1 Jul. 11, 2019

Related U.S. Application Data

(60) Provisional application No. 62/614,097, filed on Jan. 5, 2018.

(51) Int. Cl.
*G06F 15/16* (2006.01)
*H04L 29/12* (2006.01)
*H04L 29/08* (2006.01)
*H04L 29/06* (2006.01)

(52) U.S. Cl.
CPC ...... *H04L 61/2007* (2013.01); *H04L 61/1511* (2013.01); *H04L 61/1582* (2013.01); *H04L 61/6009* (2013.01); *H04L 61/6059* (2013.01); *H04L 63/0428* (2013.01); *H04L 67/02* (2013.01); *H04L 67/303* (2013.01)

(58) Field of Classification Search
USPC ........................................................ 709/245
See application file for complete search history.

(56) References Cited

U.S. PATENT DOCUMENTS

| | | | |
|---|---|---|---|
| 7,082,476 B1 * | 7/2006 | Cohen ............... | H04L 29/12009 709/246 |
| 8,438,184 B1 | 5/2013 | Wang et al. | |
| 8,732,268 B2 * | 5/2014 | Huang ............... | H04L 67/1002 709/217 |
| 9,319,379 B1 | 4/2016 | Burcham et al. | |
| 9,679,022 B2 * | 6/2017 | Kitamura ............ | H04L 61/1511 |
| 9,756,020 B2 | 9/2017 | Kaufman | |
| 10,091,312 B1 | 10/2018 | Khanwalkar | |
| 2003/0070067 A1 * | 4/2003 | Saito ..................... | H04L 9/0844 713/150 |

(Continued)

*Primary Examiner* — Anthony Mejia
(74) *Attorney, Agent, or Firm* — Muir Patent Law, PLLC

(57) ABSTRACT

An identification service may provide a device identifier that is available in both browser and non-browser applications on an electronic device. The identification service may include a domain name system server that handles domain name system queries for certain HTTP requests originating from the browser and non-browser applications. An HTTP request in the non-browser application may result in the domain name system server embedding the device identifier into an IPv6 address that is then stored in a local domain name system cache on the device. An HTTP request in the browser application may cause the browser to connect to the IPv6 address stored in the local domain name system cache. The identification service may have an HTTP server bound to the IPv6 address. The HTTP server may extract the device identifier from the IPv6 address and may provide the device identifier to the browser application.

20 Claims, 7 Drawing Sheets

(56) References Cited

U.S. PATENT DOCUMENTS

| | | | |
|---|---|---|---|
| 2004/0133675 A1* | 7/2004 | Ishiyama | H04L 29/12839 709/224 |
| 2006/0100928 A1 | 5/2006 | Walczak, Jr. et al. | |
| 2006/0112176 A1 | 5/2006 | Liu et al. | |
| 2008/0304482 A1* | 12/2008 | Grassi | H04L 69/167 370/389 |
| 2010/0023611 A1* | 1/2010 | Yang | H04L 61/1511 709/223 |
| 2011/0289185 A1* | 11/2011 | Heder | H04L 29/12066 709/217 |
| 2011/0321167 A1 | 12/2011 | Wu et al. | |
| 2012/0054860 A1* | 3/2012 | Wyschogrod | H04L 63/1416 726/22 |
| 2012/0110207 A1* | 5/2012 | Jennings | H04L 61/6004 709/245 |
| 2012/0113959 A1* | 5/2012 | Sugizaki | H04W 36/0016 370/331 |
| 2012/0265599 A1 | 10/2012 | Corner et al. | |
| 2012/0324094 A1* | 12/2012 | Wyatt | H04L 43/0876 709/224 |
| 2013/0036307 A1* | 2/2013 | Gagliano | H04L 63/0823 713/171 |
| 2013/0124309 A1 | 5/2013 | Traasdahl et al. | |
| 2013/0238425 A1 | 9/2013 | Saldanha et al. | |
| 2013/0273879 A1 | 10/2013 | Eisen et al. | |
| 2013/0275570 A1* | 10/2013 | Treuhaft | H04L 67/10 709/223 |
| 2013/0304604 A1 | 11/2013 | Hoffman et al. | |
| 2014/0207566 A1 | 7/2014 | Kamran et al. | |
| 2015/0095957 A1 | 4/2015 | Ravi | |
| 2015/0220943 A1* | 8/2015 | Dossick | H04L 61/6009 705/7.29 |
| 2015/0256508 A1* | 9/2015 | Townsend | H04L 61/1511 709/245 |
| 2015/0334158 A1 | 11/2015 | Ravi | |
| 2015/0334172 A1 | 11/2015 | Ravi | |
| 2016/0036943 A1* | 2/2016 | Kish | H04L 61/1511 709/203 |
| 2016/0050167 A1 | 2/2016 | Ramachandran | |
| 2016/0094645 A1* | 3/2016 | Ashutosh | H04L 67/1036 709/226 |
| 2016/0191455 A1* | 6/2016 | Newton | H04L 67/1021 709/245 |
| 2016/0205078 A1* | 7/2016 | James | H04L 9/006 713/171 |
| 2016/0269497 A1 | 9/2016 | Glommen et al. | |
| 2016/0294767 A1* | 10/2016 | Donaldson | H04W 12/062 |
| 2016/0301656 A1* | 10/2016 | Akcin | H04L 61/1511 |
| 2016/0364498 A1* | 12/2016 | Greene | H04L 61/609 |
| 2016/0381161 A1* | 12/2016 | Matsumura | H04L 61/1511 709/225 |
| 2017/0085412 A1 | 3/2017 | Greene | |
| 2017/0085522 A1 | 3/2017 | Greene | |
| 2017/0093759 A1 | 3/2017 | Wistow | |
| 2018/0025086 A1 | 1/2018 | Malkin et al. | |
| 2018/0048564 A1* | 2/2018 | Bianco | H04L 61/1511 |
| 2018/0241716 A1* | 8/2018 | Roberts | H04L 61/2092 |
| 2019/0253385 A1* | 8/2019 | Gurney | H04L 63/0236 |
| 2019/0268309 A1* | 8/2019 | Govindarajan | H04L 63/04 |

\* cited by examiner

IDENTIFICATION SERVICES FOR INTERNET-ENABLED DEVICES

This application claims the benefit of provisional patent application No. 62/614,097, filed Jan. 5, 2018, which is hereby incorporated by reference herein in its entirety.

FIELD

This relates generally to internet-enabled devices and, more particularly, to identification services that optimize the user's experience on internet-enabled devices.

BACKGROUND

Electronic devices such as cellular telephones, computers, and other electronic equipment are sometimes used to access the internet. For example, a user of a mobile device such as a cellular telephone may use the internet to browse the world wide web in a browser application running on the mobile device. The mobile device may also run non-browser applications that use the internet.

Device manufacturers and platform providers often associate each device or client with a device-specific identifier. The device identifier is a unique string of characters that is associated with a particular device or a particular client software installation. Device identifiers may be used by retailers, service providers, and content providers to provide targeted advertising and to keep track of existing and potential customers.

It can be challenging to access a stable device identifier on a mobile device. For example, a device identifier may be readily available in some applications running on the device but may be inaccessible in other applications running on the device.

It may therefore be desirable to provide improved device identification services for internet-enabled devices.

SUMMARY

An identification service may provide a universal device identifier that is available to both browser and non-browser applications on an electronic device. The identification service may include a domain name system server that handles domain name system queries for certain HTTP requests originating from the browser and non-browser applications. An HTTP request in the non-browser application may result in the domain name system server generating a universal device identifier and embedding the universal device identifier into an IPv6 address that is then stored in a local domain name system cache on the device. An HTTP request in the browser application may cause the browser to connect to the IPv6 address stored in the local domain name system cache. The identification service may have an HTTP server bound to the IPv6 address. The HTTP server may extract the universal device identifier from the IPv6 address and may provide the universal device identifier to the browser application.

DETAILED DESCRIPTION

A device identification service may be used to provide a stable and universal device identifier that can be accessed across different applications running on an electronic device. For example, the device identification service may extract device identification information from a non-browser application running on the electronic device and may store an associated universal device identifier in the device's local domain name system cache. When the user browses the internet in a web browsing application on the device, the device may access the universal device identifier in the local domain name system cache. The universal device identifier may be used to optimize the user's web browsing experience while the user is using the browser application.

Figure 1:
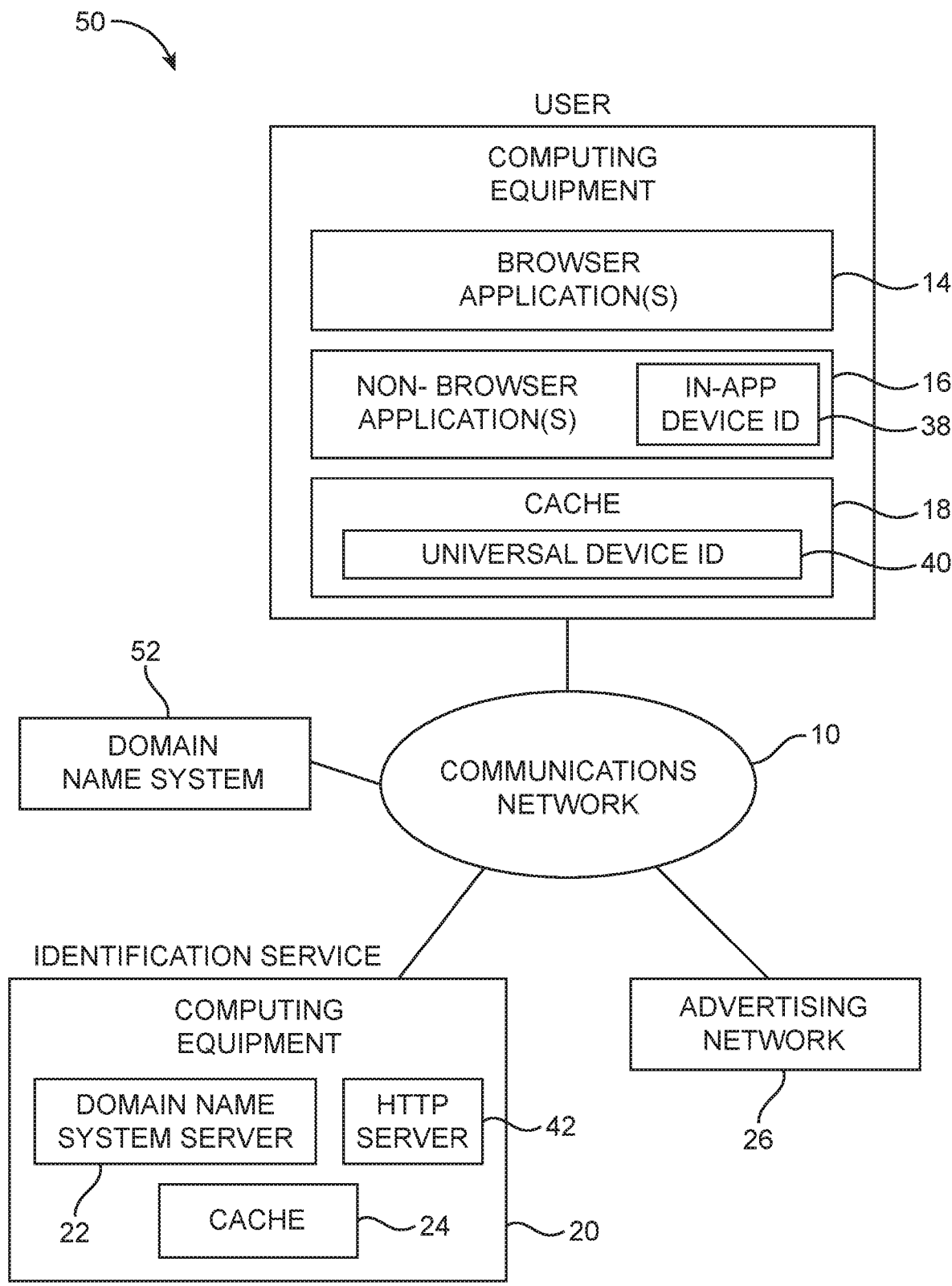
FIG. 1 is a diagram of an illustrative system in which device identification services may be provided in accordance with an embodiment.

An illustrative system environment in which a device identification service may operate is shown in FIG. 1. Users in system 50 have computing equipment 12. Computing equipment 12 may be a personal computer, a workstation, a portable computing device such as a handheld computer, laptop, cellular telephone, tablet, wristwatch, or any other suitable computing device or network of such devices. Computing equipment 12 may be used to run browser applications 14 and non-browser applications 16. During operation, applications 14 and non-browser applications 16 may use communications network 10 (e.g., the internet).

Browser applications 14 may be used to access websites using browser-based hypertext markup language (HTML) pages. A user may navigate to a website in browser application 14 by typing a universal resource locator (URL) into the address bar of the web browser in application 14 or by clicking on a website link (e.g., a website link in browser application 14 or a website link in non-browser application 16 that opens up a website in browser application 14).

Non-browser applications 16 may be written in a language that is specific to the operating system running on device 12. Users may download non-browser applications 16 from an online store of applications. To access the application, the user clicks or taps an icon associated with the application rather than typing a web address into an address bar. Although not required, non-browser applications 16 may access communications network 10 during operation (e.g., by making hypertext transfer protocol (HTTP) requests, running JavaScript code, interacting with advertising network 26, etc.).

Device 12 may store device identification information such as device identifier 38 (sometimes referred to as-in app device identifier 38). In-app device identifier 38 may be used (e.g., in combination with other information such as time, location, etc.) to uniquely identify device 12. Examples of device identifiers include unique device identifiers, identifiers for advertisers, Android advertising identifiers, and other identifiers that can uniquely identify and distinguish one device from other devices. In-app device identifier 38 may be one or more strings of characters. The string of characters may include numbers, letters, special characters, and/or other characters. The string of characters may be any suitable length (e.g., one, two, five, ten, twenty, forty, more than forty, or less than forty characters). In-app device identifier 38 may be generated and maintained by the operating system running on device 12.

In-app device identifier 38 may be used by advertising network 26 during real-time bidding auctions in which advertising inventory is bought and sold. For example, when a publisher wishes to display an advertisement, the publisher may send an advertisement request to advertising network 26. In some arrangements, the advertisement request may include in-app device identifier 38. Advertising network 26 then makes bid requests to potential buyers of the available advertisement space, passing the in-app device identifier 38 with the bid request. The potential buyers then place a bid on the available advertisement space. If the bid is won, the buyer's advertisement is instantly displayed on the publisher's page. In-app device identifier 38 may be tracked by advertisers across different non-browser applications 16 to perform cross-application measurements, optimization, and attribution. In-app device identifier 38 may also be used by advertisers to build profiles for targeted advertising. For example, in-app device identifier 38 may be used to provide an advertisement in a first non-browser application 16 that is targeted based on the user's activity in a second non-browser application 16.

Whereas in-app device identifier 38 may be readily available to advertising network 26 across different non-browser applications 16, advertisers may find it difficult to link user activity in non-browser applications 16 to user activity in browser applications 14. This is because in-app identification information such as in-app device identifier 38 generally does not extend into browser application 14. Advertising network 26 may receive other identification information in browser application 14, such as cookies. However, cookies are generally unstable (i.e., have short lifetimes). Additionally, since in-browser identification information such as cookies are not linked to in-app identification information such as in-app device identifier 38, cookies may not be as valuable to advertising network 26. For example, the shopping cart information associated with in-app device identifier 38 in non-browser application 16 may not be available to advertisers in browser application 14.

The availability, stability, and robustness of device identification information such as in-app device identifier 38 may have a significant impact on the amount a potential buyer is willing to bid on an available advertisement space. For example, a potential buyer is likely to bid significantly less for an advertisement in a browser application with weak device identification information than it would for an advertisement in a non-browser application with robust device identification information.

To ensure that robust device identification information is available in both browser applications 14 and non-browser applications 16, device 12 (and, if desired, advertising network 26) may interact with computing equipment 20. Computing equipment 20 may be an identification service that generates and maintains stable device identifiers such as device identifier 40 for device 12. Similar to in-app device identifier 38, universal device identifier 40 may be a unique string or strings of characters that uniquely identifies device 12. The string of characters may include numbers, letters, special characters, and/or other characters. The string of characters may be any suitable length (e.g., one, two, five, ten, twenty, forty, more than forty, or less than forty characters). Because device identifier 40 may be accessed in both browser applications 14 and non-browser applications 16, device identifier 40 may sometimes be referred to as a universal device identifier (even though it is unique for each respective device 12).

Computing equipment 20 may generate universal device identifier 40 based on identification information extracted from non-browser application 16, such as in-app device identifier 38. Device 12 may store universal device identifier 40 in its local domain name system (DNS) cache such as cache 18. Universal device identifier 40 in cache 18 may be accessed by both browser applications 14 and non-browser applications 16. Because universal device identifier 40 can be accessed across browser application 14 and non-browser application 16, advertisers and content publishers may be able to link in-app user activity (e.g., in-app shopping cart information and other in-app activity) with in-browser user activity using universal device identifier 40. In some arrangements, universal device identifier 40 may be sufficient on its own (e.g., without in-app device identifier 38). For example, a publisher or advertiser in non-browser application 16 may simply rely on universal device identifier 40 to build a profile of device 12 and link in-app user activity with in-browser user activity. In other arrangements, computing equipment 20 may be configured to extract in-app device identifier 38 from universal device identifier 40 so that in-app device identifier 38 is available in browser application 14.

Computing equipment 20 may include cache 24. Cache 24 may be implemented using memory and storage devices in computing equipment 20. Cache 24 may be used to store device identification information such as in-app device identifier 38, universal device identifier 40, and other information about device 12 such as an encrypted version of the device's internet protocol (IP) address. During identification service operations, the contents of cache 24 may be consulted by computing equipment 20.

Computing equipment 20 may be implemented using one or more servers or other computing equipment. Computing equipment 20 may, for example, include a domain name system server 22 that maps hostnames to IP addresses. When device 12 attempts to access a hostname associated with computing equipment 20, device 12 may consult domain name system 52, which may direct the query to domain name system server 22. Computing equipment 20 may also include an HTTP server 42 that is bound to the IP addresses that are generated by domain name system server 22.

There may be a one-to-one correspondence between hostnames and servers in system 50 or hostnames and servers may be provided using a distributed computing arrangement with multiple computers. When multiple computers are used to support identification service operations, the computers may be located at the same location or may be networked together using communications network 10. Network 10 may be any suitable wired and/or wireless network (e.g., the internet).

Device 12 may include cache 18. Cache 18 may be implemented using memory and storage devices in computing equipment 12. Information such as the results of device identification service operations may be stored in cache 18. The contents of cache 18 may be consulted to ensure that device identification information such as universal device identifier 40 and/or in-app device identifier 38 is available in both browser applications 14 and non-browser applications 16.

Cache 18 may, for example, be a local domain name system cache that stores results provided by domain name system 52. Cache 18 may include records of recent visits and attempted visits to websites and other internet domains. In particular, cache 18 may include an index of hostnames and their corresponding IP addresses (e.g., IPv4 addresses, IPv6 addresses, or other suitable internet protocol addresses). When a user visits or attempts to visit a hostname on browser application 14 or non-browser application 16, device 12 may look up the IP address for the hostname on cache 18. Device 12 may also look up information in cache 18 upon request from content providers that are providing content in browser application 14 or non-browser application 16.

If the hostname and IP address are not found in cache 18, device 12 may initiate a domain name system lookup process. This may include sending a request for the IP address of the hostname to domain name system 52. Domain name system 52 may be a hierarchical decentralized naming system that provides information for mapping hostnames to IP addresses. When domain name system 52 receives a query from device 12 requesting the IP address for a given hostname, domain name system 52 initiates an address resolution mechanism to obtain the IP address for the hostname.

In some arrangements, domain name system 52 may include a domain name system resolver that determines the domain name servers responsible for the given hostname using a sequence of queries starting with the right-most portion of the domain label (e.g., com, org, etc.). For example, domain name system 52 may begin the resolution process by querying an appropriate root name server, which may respond with a referral to a more authoritative sever. The resolver then queries the server referred to, and this process is repeated until the resolver receives an authoritative answer. In some arrangements, root server results may be cached on domain name system servers so that root servers are not involved in every request. Once the domain name system 52 obtains an authoritative answer, domain name system 52 may send the resolved address to device 12 over network 10. Device 12 may store the domain name system results in cache 18. Domain name system 52 may direct certain domain name system queries to domain name system server 22 of computing equipment 20.

Cache 18 may be consulted by both browser application 14 and non-browser application 16. For example, when a user visits a hostname in browser application 14, browser application 14 consults cache 18 to determine the IP address associated with the hostname. Similarly, non-browser application 16 consults cache 18 to determine the IP address associated with a hostname that the user wishes to visit in non-browser application 16. Because cache 18 is accessed by both browser application 14 and non-browser application 16, computing equipment 20 may embed device identification information in an IP address that is then stored in cache 18. This ensures that device identification information such as universal device identifier 40 and in-app device identifier 38 is available in both browser application 14 and non-browser application 16.

The universal device identifier 40 in cache 18 may be accessed in browser application 14 using a domain name system lookup process. The domain name system lookup process may direct a domain name system query to domain name system 52, which may then direct the query to domain name system server 22 associated with computing equipment 20.

Domain name system server 22 associated with computing equipment 20 may handle domain name system queries for certain domains from browser application 14 and non-browser application 16. Domain name system queries from non-browser applications 16 may pass device identifier 38 to domain name system server 22 in computing equipment 20 and may be used to create universal device identifier 40. Universal device identifier 40 may be embedded into an IP address, and the IP address may be sent back to device 12 to be stored in domain name system cache 18. To access universal device identifier 40 in browser application 14, a domain name system lookup process may be initiated in browser application 14, which directs the browser to the IP address with the embedded universal device identifier. Computing equipment 20 may include server 42 (e.g., a hypertext transfer protocol server) that is bound to the IP address with the embedded universal device identifier 40. This server may be configured to extract universal device identifier 40 from the IP address. The server may provide universal device identifier 40 to browser application 14. If desired, computing equipment 20 may also determine the in-app device identifier 38 associated with universal device identifier 40 and may send a response to browser application 14 with the in-app device identifier 38. Once available in browser application 14, publishers may provide universal device identifier 40 and/or in-app device identifier 38 to advertising network 26 for real-time bidding auctions. In other arrangements, advertising network 26 may extract universal device identifier 40 and/or in-app device identifier 38 using code running on the publisher's page.

Figure 2:
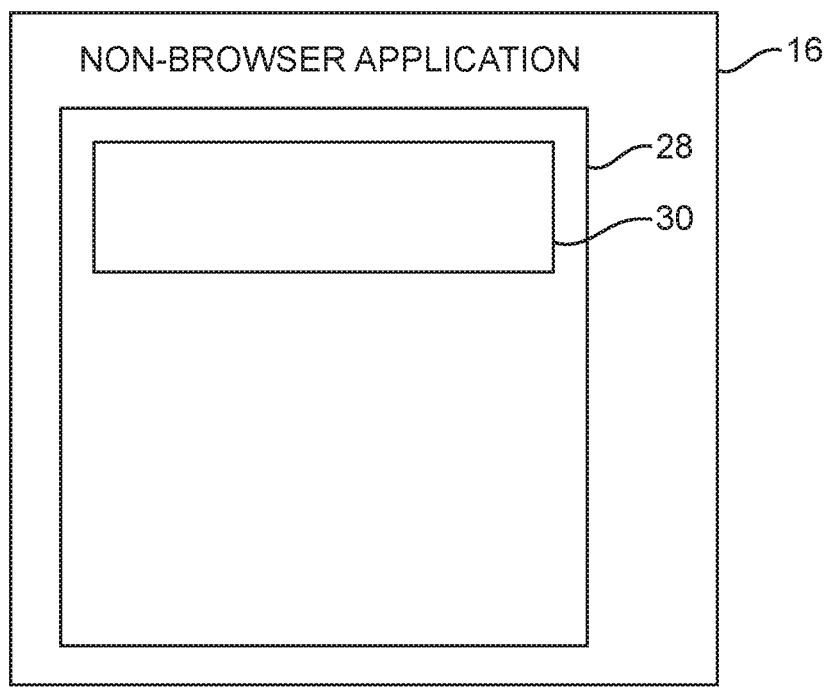
FIG. 2 shows an illustrative non-browser application running on an electronic device in accordance with an embodiment.
Figure 3:
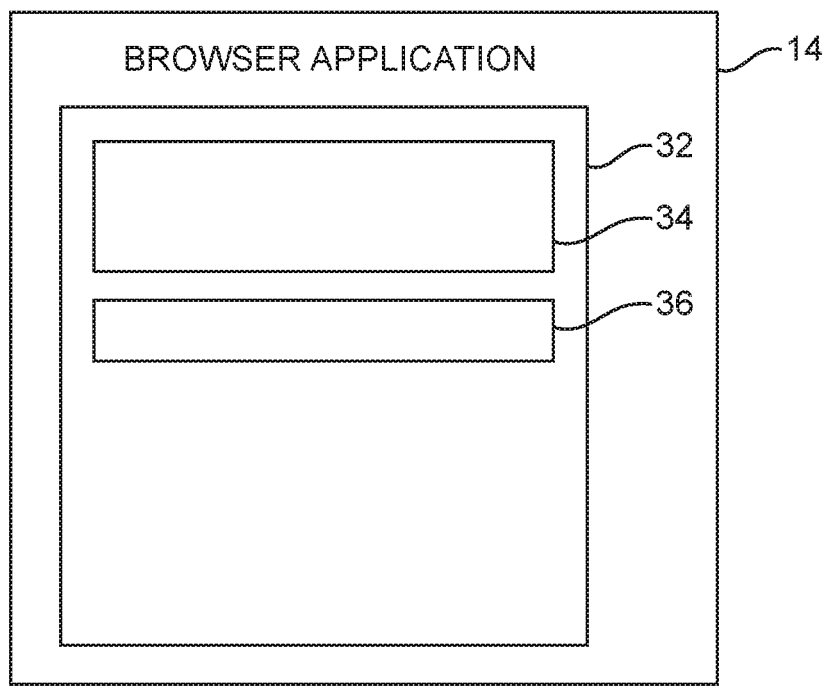
FIG. 3 shows an illustrative browser application running on an electronic device in accordance with an embodiment.

FIGS. 2 and 3 illustrate how device identification information may be made available to advertising network 26 in both an in-app advertising scenario and an in-browser advertising scenario.

As shown in FIG. 2, non-browser application 16 may display a page 28 with advertising space 30. When the publisher of non-browser application 16 wishes to place an advertisement in space 30, non-browser application 16 sends an advertising request to advertising network 26. The advertising request may include in-app device identifier 38. Advertising network 26 may then make bid requests to potential buyers, passing in-app device identifier 38 with the bid requests so that the potential buyers can take this information into account when placing a bid. The winning bidder's advertisement may then be displayed in space 30.

Instead of or in addition to obtaining in-app device identifier 38, advertising network 26 or the publisher of page 28 may initiate a domain name system lookup process to obtain universal device identifier 40 that is stored in cache 18. This type of arrangement may be useful when a publisher or advertiser wishes to use universal device identifier 40 from computing equipment 20 to build a profile of device 12 across browser application 14 and non-browser application 16.

As shown in FIG. 3, browser application 14 may display a page 32 with advertising space 34. When the publisher of page 32 wishes to display an advertisement in space 34, browser application 14 may send an advertising request to advertising network 26. The advertisement request may not include in-app device identifier 38. However, universal device identifier 40 may be stored in cache 18 of device 12. To extract universal device identifier 40, page 32 may include computer code 36. Computer code 36 may be a URL link, JavaScript code, or other computer code that initiates a domain name system lookup process. The domain name system lookup process begins with browser application 14 consulting cache 18 to determine if the hostname and IP address associated with computer code 36 are stored in cache 18. If the hostname and IP address are stored in cache 18, browser 14 may connect to the IP address associated with computer code 36. The IP address may be bound to a hypertext transfer protocol server associated with computing equipment 20. Computing equipment 20 may extract universal device identifier 40 from the IP address. If desired, computing equipment 20 may also determine the in-app device identifier 38 associated with universal device identifier 40. Computing equipment 20 may provide universal device identifier 40 and/or in-app device identifier 38 to browser 14, to the publisher of page 32, or to advertising network 26.

Computer code 36 may be provided by the publisher of page 32 (e.g., so that the publisher can extract universal device identifier 40 from cache 18), may be provided by advertising network 26 (e.g., so that advertising network 26 can extract universal device identifier 40 from cache 18), or may be provided by computing equipment 20.

In some arrangements, publishers and advertisers may wish to build a profile of device 12 using universal device identifier 40 only. For example, a publisher of page 28 in non-browser application 14 may associate in-app user activity such as placing an item in a shopping cart with universal device identifier 40. When that same publisher bids on advertising space 34 on page 32 in browser application 14, the publisher may again extract universal device identifier 40 from cache 18 (or via a query to the domain name system server associated with computing equipment 20). Seeing that universal device identifier 40 in browser application 14 matches universal device identifier 40 extracted from non-browser application 16, the publisher may deduce that the same user that placed an item in his or her shopping cart in non-browser application 16 is now visiting page 32 in browser application 14. Based on this information, the publisher may be willing to place a higher bid for advertising space 34 (e.g., to show the user an advertisement for the item that was placed in his or her shopping cart in non-browser application 16).

This is, however, merely illustrative. In arrangements where a publisher or advertiser wishes to build a profile of device 12 using in-app device identifier 38, computing equipment 20 may extract in-app device identifier 38 from universal device identifier 40 and may provide in-app device identifier 38 to the publisher or advertiser.

Figure 4:
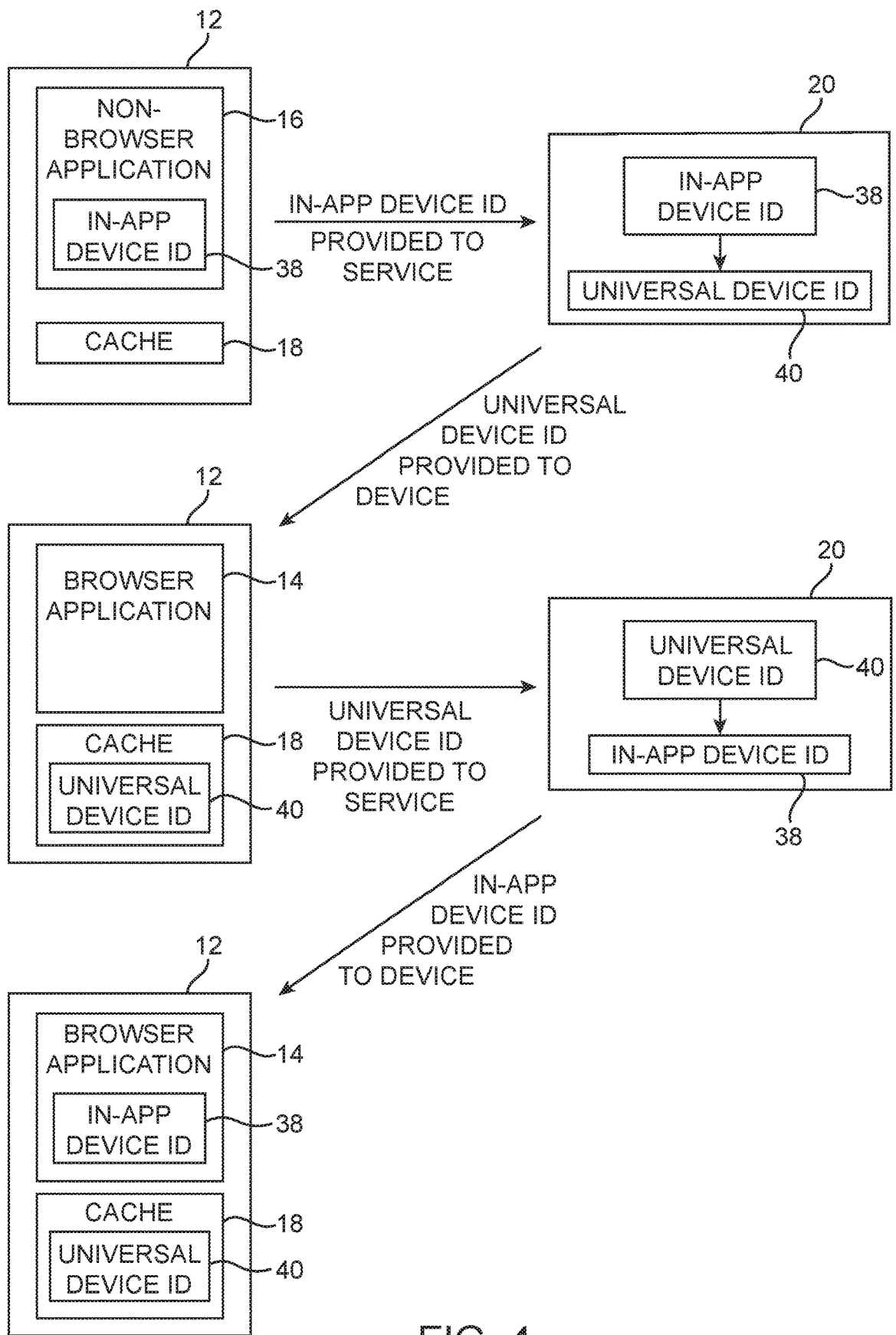
FIG. 4 is a diagram illustrating the operations of an illustrative device identification service in accordance with an embodiment.

FIG. 4 is a diagram illustrating how computing equipment 20 may extract device identification information such as in-app device identifier 38 from non-browser application 16 and make the device identification information available in browser application 14. FIG. 4 shows a series of five blocks, with each block showing a different state of device 12 or computing equipment 20 throughout the process. The process starts with the top left block and moves from left to right and top to bottom, ending with the bottom left block.

As shown in the first block of FIG. 4, the process begins with device 12 running non-browser application 16. Computing equipment 20 may publish computer code associated with an ID write hostname on non-browser application 16. When device 12 makes an HTTP request to the ID write hostname in non-browser application 16 (e.g., in response to the user clicking a link or visiting a page with JavaScript or other computer code associated with the ID write hostname), non-browser application 16 may initiate a domain name system lookup process by sending a domain name system query to domain name system server 22 of computing equipment 20. The domain name system query may include a request for the IP address associated with the ID write hostname. The domain name system query may also include identification information such as in-app device identifier 38, the IP address of device 12, and/or other identification information.

As shown in the second block of FIG. 4, computing equipment 20 may receive device identification information such as in-app device identifier 38 from device 12 and may generate an associated universal device identifier 40. Computing equipment 20 may embed universal device identifier 40 (or an encrypted or encoded version of universal device identifier 40) into an IP address (e.g., an IPv4 address, an IPv6 address, or other suitable internet protocol address).

Computing equipment 20 may return a canonical name (CNAME) record to device 12 indicating that the ID write hostname is an alias for an ID read hostname. This causes device 12 to make another domain name system query to domain name system server 22 of computing equipment 20. Computing equipment 20 may provide a response to the domain name system query indicating that the ID read hostname should be directed to the IP address with the embedded universal device identifier 40. The IP address with the embedded universal device identifier 40 may be bound to an HTTP server or other equipment associated with computing equipment 20.

As shown in the third block of FIG. 4, the results of the domain name system query to computing equipment 20 may be stored in domain name system cache 18 on device 12. Since the domain name system query results indicated that the ID read hostname should be directed to an IP address that contains universal device identifier 40, cache 18 may be used to store universal device identifier 40. To extract universal device identifier 40 in browser application 14, computing equipment 20, advertising network 26, and/or a content publisher may publish computer code (e.g., code 36 of FIG. 3) associated with the ID read hostname in browser application 14. When browser application 14 makes an HTTP request to the ID read hostname in browser application 14 (e.g., in response to the user clicking a link or visiting a page with JavaScript or other computer code associated with the ID read hostname), browser application 14 may consult domain name system cache 18 to determine the IP address for the ID read hostname. Browser application 14 may then connect to the IP address stored in cache 18. Computing equipment 20 may include a server (e.g., HTTP server 42 of FIG. 1) bound to the IP address.

As shown in the fourth block of FIG. 4, computing equipment 20 (e.g., the HTTP server 42 that is bound to the IP address that contains universal device identifier 40) may determine the in-app device identifier 38 associated with universal device identifier 40. Computing equipment 20 may provide in-app device identifier 38 and/or universal device identifier 40 to device 12.

As shown in the fifth block of FIG. 4, in-app device identifier 38 is available in browser application 14 upon receiving in-app device identifier 38 from computing equipment 20. In-app device identifier 38 may be provided to advertising network 26 to be used in a real-time bidding auction for advertisement space 34 (FIG. 3) in browser application 14, or in-app device identifier 38 may be used for other purposes in browser application 14.

In some arrangements, a publisher or advertiser may rely on universal device identifier 40 to build a profile of device 12, in which case it may not be necessary for computing equipment 20 to provide in-app device identifier 38.

Figure 5:
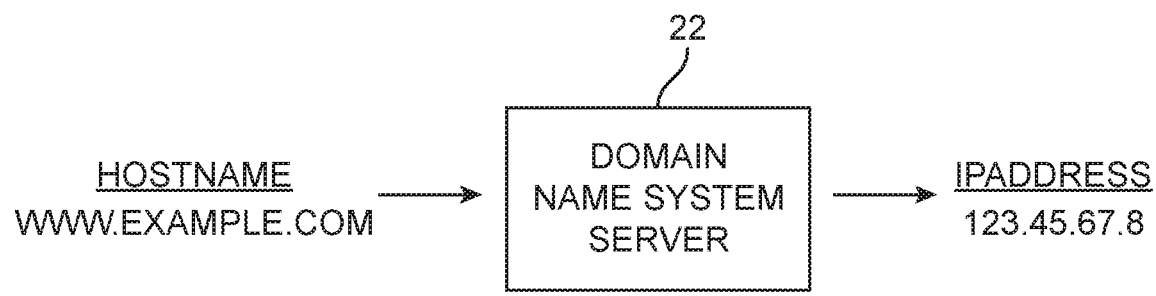
FIG. 5 is a diagram illustrating the operations of an illustrative domain name system server in accordance with an embodiment.

FIG. 5 is a diagram showing how domain name system server 22 maps hostnames to IP addresses. Domain name system server 22 may be configured to handle queries for domain names associated with computing equipment 20 (e.g., an ID write hostname, an ID read hostname, and other hostnames and domains associated with computing equipment 20). When device 12 makes a domain name system query requesting the IP address associated with an ID write hostname in non-browser application 16, domain name system server 22 may receive identification information such as in-app device identifier 38 and may generate a corresponding universal device identifier 40 for device 12. Domain name system server 22 may store universal device identifier 40, in-app device identifier 38, and an encrypted (e.g., hashed) version of the IP address of device 12 in cache 24 (FIG. 1). Domain name system server 22 may then return a CNAME record to device 12 indicating that the ID write hostname is an alias for the ID read hostname. This causes device 12 to make a domain name system query requesting the IP address for the ID read hostname. Domain name system server 22 then looks up the IP address of device 12 and universal device identifier 40 stored in cache 24 and generates an IP address with universal device identifier 40 embedded into the IP address. The IP address may be associated with HTTP server 42 of computing equipment 20. Domain name system server 22 may provide a response to device 12 indicating that the ID read hostname is associated with the IP address having the embedded universal device identifier 40. As shown in FIG. 5, the ID read hostname may be "www.example.com" and the IP address having the embedded universal device identifier 40 may be "123.45.67.8" (as an example). The example of FIG. 5 in which the IP address with the embedded universal device identifier 40 is an IPv4 address is merely illustrative, however. As explained below in connection with FIG. 7, computing equipment 20 may embed universal device identifier 40 in an IPv6 address instead of an IPv4 address.

Figure 6:
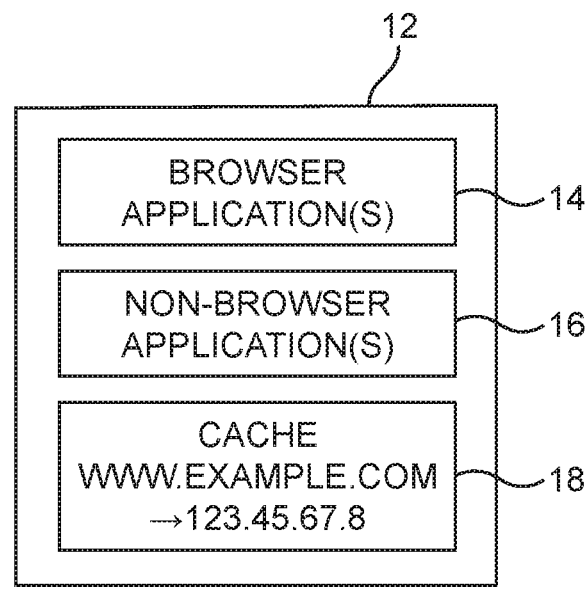
FIG. 6 is a diagram of an illustrative electronic device having browser applications and non-browser applications that use a local domain name system cache to access information on the internet in accordance with an embodiment.

FIG. 6 shows how domain name system cache 18 may store the results of the domain name system lookup process described in connection with FIG. 5. Universal device identifier 40 may be embedded in the IP address stored in cache 18. Anytime the user visits the ID read hostname (e.g., "www.example.com") in browser application 14, browser application 14 will consult cache 18 to determine the IP address associated with the ID read hostname (e.g., "123.45.67.8"). Once connected to HTTP server 42 at the IP address, HTTP server 42 may extract universal device identifier 40 from the IP address and may return universal device identifier 40 to browser application 14.

Figure 7:
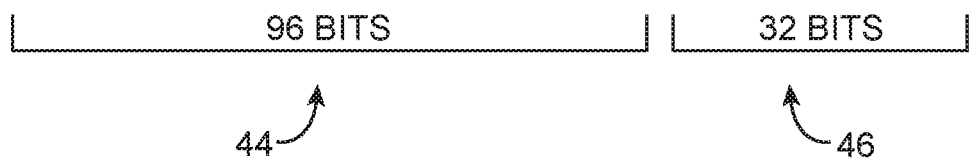
FIG. 7 is a diagram of an illustrative internet protocol address that may have an embedded device identifier in accordance with an embodiment.

FIG. 7 shows an illustrative IP address that may be used to embed universal device identifier 40. In the example of FIG. 7, the IP address is an internet protocol version (IPv6) address having 128 bits. A first portion of the IPv6 address such as portion 44 (e.g., the first 96 bits of the IP address) may be fixed, whereas a second portion of the IPv6 address such as portion 46 (e.g. the last 32 bits of the IP address) may be variable. Computing equipment 20 may store universal device identifier 40 in portion 46 of the IPv6 address (e.g., by storing the string or strings of characters that make up universal device identifier 40 or by storing a different string of characters from which universal device identifier 40 can later be determined).

Figure 8:
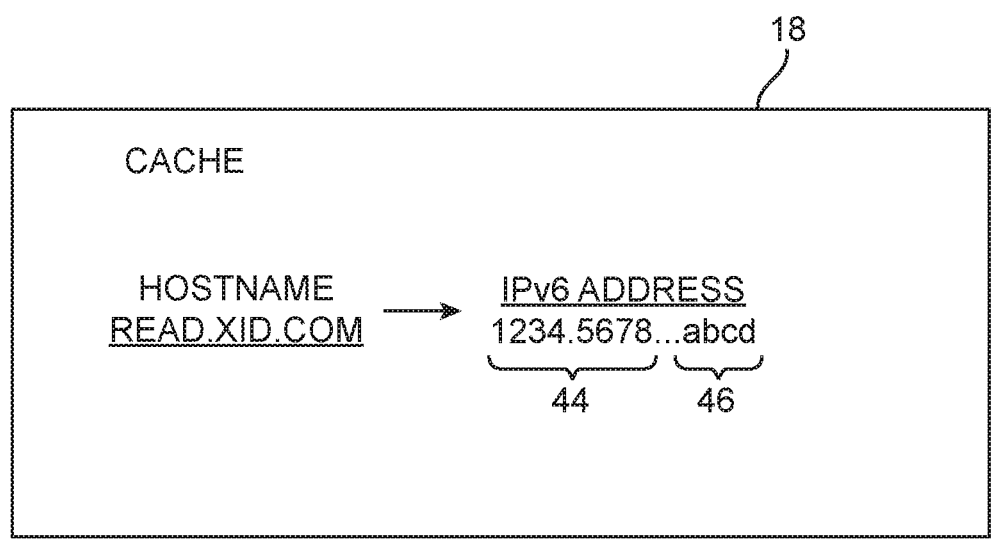
FIG. 8 is a diagram of an illustrative local domain name system cache in which internet protocol addresses of the type shown in FIG. 7 are stored in accordance with an embodiment.

FIG. 8 shows how domain name system cache 18 of device 12 may store an IPv6 address having an embedded device identifier. In this example, the ID read hostname ("read.xid.com") directs device 12 to an IPv6 address. Universal device identifier 40 (or an encrypted or encoded version of universal device identifier 40) may be embedded into portion 46 of the IPv6 address. When the user visits the ID read hostname ("read.xid.com") in browser application 14, browser application 14 will consult cache 18 to determine the IPv6 address associated with the ID read hostname ("1234.5678 . . . abcd"). Once connected to HTTP server 42 at the IPv6 address, HTTP server 42 may extract universal device identifier 40 (and, if desired, in-app device identifier 38) from portion 46 of the IPv6 address and may return universal device identifier 40 and/or in-app device identifier 38 to browser application 14.

Figure 9:
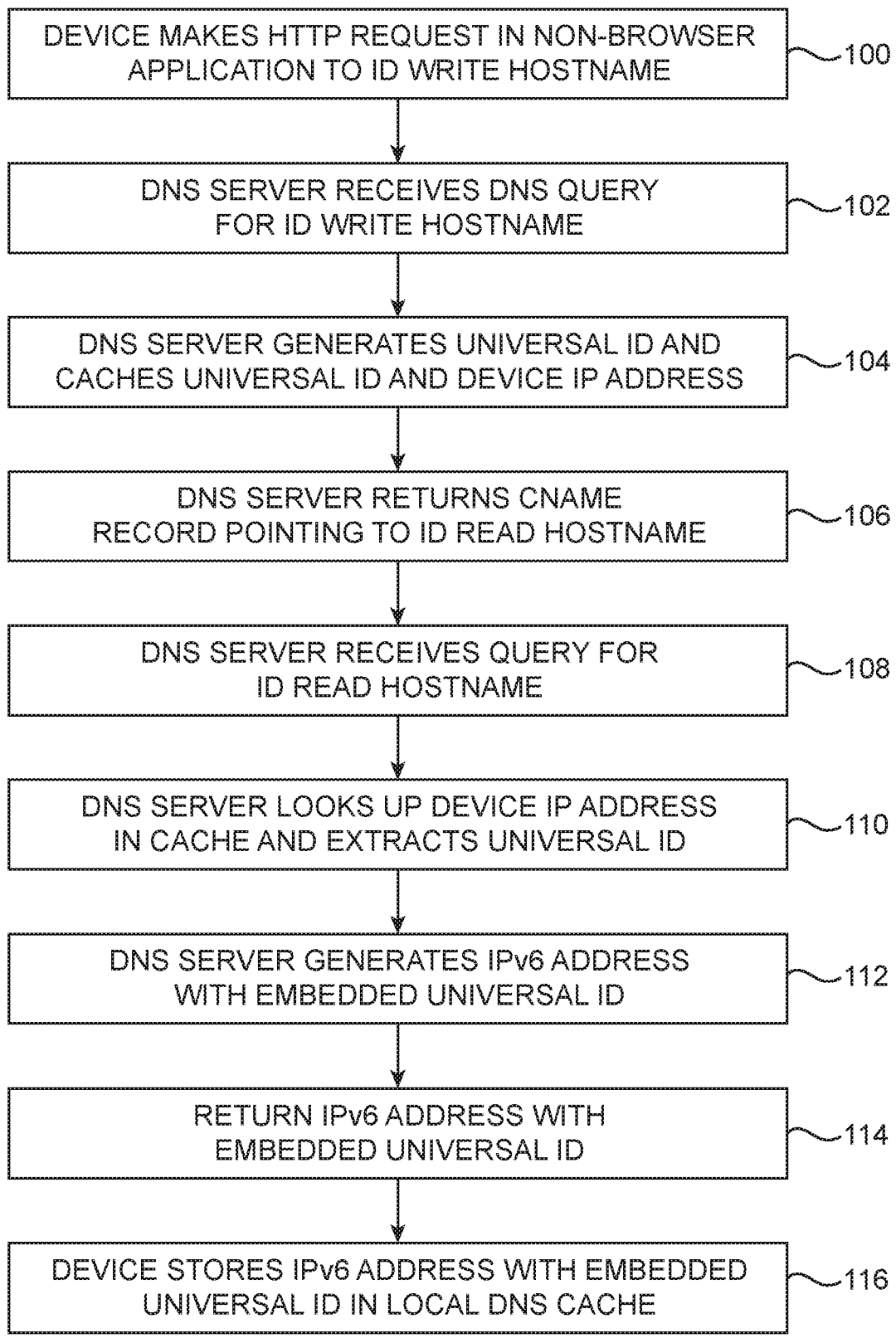
FIG. 9 is a flow chart of illustrative steps involved in providing a universal device identifier to an electronic device in accordance with an embodiment.

FIG. 9 is a flow chart of illustrative steps involved in creating a universal device identifier 40 for device 12.

At step 100, device 12 makes an HTTP request in non-browser application 16 to an ID write hostname provided by computing equipment 20. Device 12 may make an HTTP request to the ID write hostname by clicking on a link (e.g., a link that redirects the user to the ID write hostname), by visiting a page with JavaScript that directs the user to the ID write hostname, or by interacting with other computer code in non-browser application 16 that directs the user to the ID write hostname.

At step 102, domain name system server 22 of computing equipment 20 receives a query from device 12 requesting the IP address for the ID write hostname (e.g., "write.xid.com"). Because the query is coming from non-browser application 16, the domain name system request may include device identification information such as in-app device identifier 38.

At step 104, domain name system server 22 generates universal device identifier 40 for device 12 and stores universal device identifier 40, in-app device identifier 38, and an encrypted version of the IP address of device 12 (e.g., an IPv6 address or IPv4 address) in cache 24.

At step 106, domain name system server 22 returns a canonical name record indicating that the ID write hostname is an alias for the ID read hostname.

At step 108, domain name system server 22 receives a query from device 12 for the ID read hostname.

At step 110, domain name system server 22 looks up the IP address of device 12 in cache 24 and extracts the universal device identifier 40 and/or the in-app device identifier 38 associated with that IP address.

At step 112, domain name system server 22 generates an IPv6 address with universal device identifier 40 (or an encrypted or encoded version of universal device identifier 40) embedded into it. Universal device identifier 40 may, for example, be embedded into end portion 46 of the IPv6 address.

At step 114, domain name system server 22 returns the IPv6 address with the embedded universal device identifier 40 to device 12.

At step 116, device 12 stores the domain name system results in domain name system cache 18. The domain name system results may indicate that the ID read hostname should be directed to the IPv6 address with the embedded universal device identifier 40.

Figure 10:
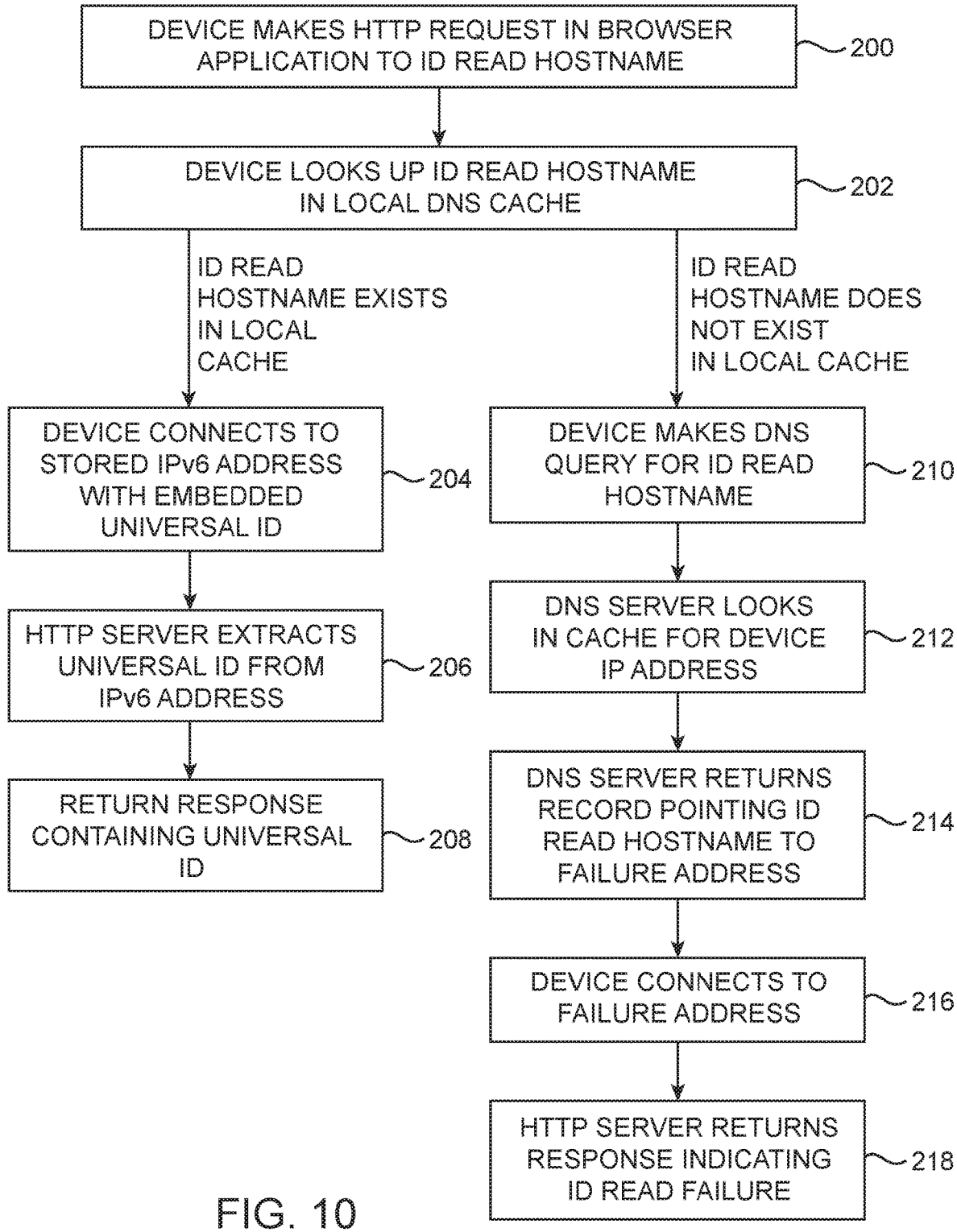
FIG. 10 is a flow chart of illustrative steps involved in accessing a universal device identifier on an electronic device in accordance with an embodiment.

A flow chart of illustrative steps involved in reading a universal device identifier 40 stored in cache 18 of device 12 is shown in FIG. 10.

At step 200, device 12 makes an HTTP request in browser application 14 to the ID read hostname provided by computing equipment 20. Device 12 may make an HTTP request to the ID read hostname by clicking on a link (e.g., a link that redirects the user to the ID read hostname), by visiting a page with JavaScript that directs the user to the ID read hostname, or by interacting with other computer code in browser application 14 (e.g., code 36 of FIG. 3) that directs the user to the ID read hostname.

At step 202, browser application 14 consults cache 18 to determine the IP address for the ID read hostname. If it is determined in step 202 that the ID read hostname exists in local cache 18, operations proceed to step 204.

At step 204, device 12 connects to the IPv6 address stored in cache 18, which includes the embedded universal device identifier 40. This causes device 12 to connect to HTTP server 42 of computing equipment 20, which is bound to the IPv6 address with the embedded universal device identifier 40.

At step 206, HTTP server 42 of computing equipment 20 that is bound to the IPv6 address with the embedded universal device identifier 40 extracts universal device identifier 40 from the IPv6 address. If desired, computing equipment 20 may also look up the in-app device identifier 38 associated with universal device identifier 40.

At step 208, HTTP server 42 of computing equipment 20 returns a response containing universal device identifier 40 and/or in-app device identifier 38. The response may be provided to browser application 14, to a publisher of a website that is visited on browser application 14, and/or to advertising network 26.

If it is determined in step 202 that the ID read hostname does not exist in local cache 18, operations proceed to step 210.

At step 210, device 12 makes a domain name system query for the IP address associated with the ID read hostname.

At step 212, domain name system server 22 receives the domain name system query and looks in cache 24 for the IP address of device 12. Upon not finding the IP address of device 12 in cache 24, operations proceed to step 214.

At step 214, domain name system server 22 returns a record pointing the ID read hostname to a failure address.

At step 216, device 12 connects to the failure address, which may be associated with an HTTP server (e.g., HTTP server 42) of computing equipment 20.

At step 218, HTTP server 42 of computing equipment 20 returns a response indicating that there has been an ID read failure.

If desired, computing equipment 20 may implement a process for determining whether a universal device identifier 40 has already been provided to device 12. This process may take place before performing the write process of FIG. 9. The process may begin with the device 12 making an HTTP request to a check ID hostname. The check ID hostname may share a domain with the ID read hostname to ensure that if the user already has a universal device identifier 40 embedded in an IP address in cache 18, device 12 will connect to that IP address. Device 12 may make an HTTP request to the check ID hostname by clicking on a link (e.g., a link that redirects the user to the check ID hostname), by visiting a page with JavaScript that directs the user to the check ID hostname, or by interacting with other computer code in non-browser application 16 that directs the user to the check ID hostname.

If device 12 does not have a universal device identifier 40 already stored in cache 18, device 12 will make a domain name system query to domain name system server 22 of computing equipment 20 requesting the IP address for the check ID hostname. The domain name system server will not find the IP address of device 12 in its cache 24, so it will return a response pointing the check ID hostname to a failure address. When device 12 connects to the HTTP server at the failure address, the HTTP server will redirect to the user to the write ID hostname, which in turn will trigger the steps of FIG. 9 for writing a universal device identifier 40 in cache 18 of device 12.

If computing equipment 20 has already provided a universal device identifier 40 to device 12, device 12 will connect to the IP address associated with the ID read hostname. The HTTP server at the IP address will detect that the incoming IP address of device 12 already has a universal device identifier 40 and will return a response to device 12 indicating that a universal device identifier 40 already exists in cache 18.

If desired, computing equipment 20 may maintain a database of device identifiers (e.g., universal device identifiers 40 and/or in-app device identifiers 38) associated with users that have opted-out of identification services from computing equipment 20. During the ID read operations of FIG. 10, computing equipment 20 may consult the opt-out database to determine if the extracted device identifier is associated with a device that has opted out of identification services. For example, following step 206 of FIG. 10, HTTP server 42 of computing equipment 20 may determine if the extracted device identifier is located in the opt-out database. If the device identifier is located in the opt-out database, HTTP server 42 may return an ID read failure response to device 12.

The foregoing is merely illustrative of the principles of this invention and various modifications can be made by those skilled in the art without departing from the scope and spirit of the invention.

What is claimed is:

1. A method for operating computing equipment, comprising:
    receiving a domain name system query from an electronic device;
    in response to receiving the domain name system query from the electronic device, creating a device identifier that uniquely identifies the electronic device;
    embedding the device identifier in an internet protocol address; and
    returning a domain name system result to the electronic device, wherein the domain name system result includes the internet protocol address having the device identifier embedded therein.

2. The method defined in claim 1 wherein the internet protocol address comprises an internet protocol version 6 address.

3. The method defined in claim 1 wherein the computing equipment has a cache and the electronic device has a device internet protocol address, the method further comprising:
    in response to receiving the domain name system query from the electronic device, encrypting the device internet protocol address; and
    storing the encrypted device internet protocol address and the device identifier in the cache.

4. The method defined in claim 3 wherein the domain name system query requests information for a first hostname, the method further comprising:
    returning a canonical name record to the electronic device indicating that the first hostname is an alias for a second hostname.

5. The method defined in claim 4 further comprising:
    receiving an additional domain name system query, wherein the additional domain name system query requests information for the second hostname.

6. The method defined in claim 5 further comprising:
    in response to receiving the additional domain name system query, consulting the cache to determine the device identifier associated with the electronic device.

7. The method defined in claim 6 wherein returning the domain name system result to the electronic device comprises returning a record indicating that the second hostname has the internet protocol address with the embedded device identifier.

8. The method defined in claim 7 wherein the computing equipment comprises a domain name system server that receives the domain name system query and the additional domain name system query.

9. The method defined in claim 8 wherein the computing equipment comprises a hypertext transfer protocol server that is bound to the internet protocol address with the embedded device identifier.

10. The method defined in claim 9, further comprising:
    with the hypertext transfer protocol server, receiving a hypertext transfer protocol request from the electronic device to connect to the first hostname.

11. The method defined in claim 1,
    wherein the computing equipment comprises a server associated with the internet protocol address, and
    wherein the method further comprises, with the server:
    receiving a request from the electronic device to connect to the server, the request comprising the internet protocol address, wherein the internet protocol address has the device identifier embedded therein;
    extracting the device identifier from the internet protocol address; and
    returning a response to the electronic device, wherein the response includes the device identifier.

12. The method defined in claim 11 wherein the server comprises a hypertext transfer protocol server.

13. The method defined in claim 11 wherein the internet protocol address comprises an internet protocol version 6 address.

14. The method defined in claim 11 wherein receiving the request from the electronic device comprises receiving a hypertext transfer protocol request from a browser application running on the electronic device.

15. The method defined in claim 14 wherein returning the response to the electronic device comprises returning the device identifier to the browser application running on the electronic device, and wherein the device identifier is associated with activity in a non-browser application running on the electronic device.

16. A computer system, comprising:
    computing equipment comprising a domain name server and a hypertext transfer protocol server,
    wherein the domain name system server is configured to receive a domain name system query from an electronic device, to create a device identifier that uniquely identifies the electronic device in response to receiving the domain name system query from the electronic device, to embed the device identifier into an internet protocol address, and to return the internet protocol address having the device identifier embedded therein to the electronic device; and
    wherein the hypertext transfer protocol server is bound to the internet protocol address, and is configured to extract the device identifier from the internet protocol address and to provide the device identifier to the electronic device.

17. The computing system of claim 16 wherein the domain name system server is configured to receive the domain name system query from a non-browser application running on the electronic device.

18. The computing system of claim 17 wherein the hypertext transfer protocol server is configured to extract the device identifier in response to a hypertext transfer protocol request from a browser application running on the electronic device.

19. The computing system of claim 16 wherein the internet protocol address comprises an internet protocol version 6 address and wherein the device identifier is embedded into the last 32 bits of the internet protocol version 6 address.

20. The computing system of claim 16 further comprising the electronic device, wherein the electronic device has an associated internet protocol address and wherein the domain name system server comprises a cache that is configured to store the device identifier and an encrypted version of the internet protocol address associated with the electronic device.

* * * * *